United States Patent
Nakazato et al.

(12) 
(10) Patent No.: US 6,345,142 B1
(45) Date of Patent: Feb. 5, 2002

(54) OPTICAL ATTENUATION DEVICE HAVING DIFFERENT TYPE MAGNETO-OPTICAL OPTICAL ATTENUATION ELEMENTS CASCADED TOGETHER

(75) Inventors: Hiroaki Nakazato, Oyama; Masashige Kawarai, Oomiya, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/414,499

(22) Filed: Oct. 8, 1999

(30) Foreign Application Priority Data

Feb. 18, 1999 (JP) .......................................... 11-039337

(51) Int. Cl.$^7$ ................................................ G02F 1/09
(52) U.S. Cl. ...................... 385/140; 359/280; 359/283; 359/324
(58) Field of Search ................... 385/140, 24; 359/237, 359/238, 240, 280–284, 246, 324, 484, 115, 122, 124–134

(56) References Cited

U.S. PATENT DOCUMENTS

| | | | |
|---|---|---|---|
| 5,812,304 A | | 9/1998 | Shirasaki et al. ............ 359/324 |
| 5,867,300 A | * | 2/1999 | Onaka et al. ................ 359/283 |
| 5,889,609 A | | 3/1999 | Fukushima .................. 359/280 |
| 5,933,552 A | * | 8/1999 | Fukushima et al. ........... 385/24 |
| 5,953,470 A | * | 9/1999 | Toyohara ..................... 385/24 |
| 5,978,122 A | * | 11/1999 | Kawazawa et al. ......... 359/179 |
| 6,038,357 A | * | 3/2000 | Pan .............................. 385/24 |
| 6,115,519 A | * | 9/2000 | Espindola et al. ............ 385/43 |

* cited by examiner

Primary Examiner—Akm E. Ullah
Assistant Examiner—Michelle R. Connelly-Cushwa
(74) Attorney, Agent, or Firm—Staas & Halsey LLP

(57) ABSTRACT

An optical attenuation device to attenuate the intensity of incident light, comprising an optical attenuation unit including at least two different type magneto-optical optical attenuation elements coupled in a cascade together.

24 Claims, 11 Drawing Sheets

OPTICAL ATTENUATION DEVICE HAVING DIFFERENT TYPE MAGNETO-OPTICAL OPTICAL ATTENUATION ELEMENTS CASCADED TOGETHER

CROSS-REFERENCE TO RELATED APPLICATION

This application is based upon and claims priority of Japanese patent application1 No.11-039337 filed on Feb. 18, 1999, the contents being incorporated herein by reference.

BACKGROUND OF THE INVENTION

1. Field of the invention

The present invention relates to an optical attenuation device. More particularly, the present invention relates to an optical attenuation device having at least two different type magneto-optical optical attenuation elements coupled in a cascade together.

2. Description of the Related Art

It is believed that in the beginning of the $21^{st}$ century, as broadband multimedia service truly becomes widespread, the telecommunications capacity of trunk line networks will require systems in the terabit class (terabit/second), which has a hundred times greater capacity than current systems.

With this sort of demand, wavelength division multiplexing (WDM) transmission is being touted as the next generation of telecommunications technology.

WDM transmits a plurality of lights with differing wavelengths over a single optical fiber. Multiplexing along the wavelength axis allows the transmission of a large volume of data. Because the transmission rate of the wavelengths can be set low, the burden on the electronic and optical devices is relaxed, and there is little optical pulse wavelength deterioration from the non-linear characteristics of optical fiber, and the wavelength and polarized wave dispersion characteristics. This is an advantage of WDM.

FIG. 1 shows the relationship between wavelength and intensity of optical signals that have been subject to wavelength division multiplexing. In the example of FIG. 1, the n number of lights $\lambda 1$ through $\lambda n$ with differing wavelengths are disposed at intervals of 0.8 nm, and the light of each wavelength is carrying different information.

With this WDM, an optical attenuation device is prepared for each wavelength, in order to make uniform the power of the lights with varying wavelengths. Each optical attenuation device must be controlled in accordance with the power of the output light of the optical attenuation device.

Also, because the attenuation characteristic of optical fiber is somewhat different depending upon the wavelength, an optical attenuation device must apply attenuation characteristic and the reverse pre-emphasis characteristic to the pre-transmission light signal, and try to make uniform the power of the post-transmission light signal. FIG. 2 shows one example of these types of pre-emphasis characteristic. In this example, the light is emphasized in proportion to the wavelength.

Optical attenuation devices used in this manner to adjust the power of the light must appropriately adjust their attenuation characteristic in accordance with the output characteristic of the light signal. For this reason, optical attenuation devices using, for example, magneto-optical optical attenuation elements are widely used.

There are two types of magneto-optical optical attenuation elements, the D type and the I type. FIG. 3 shows the relationship between current and attenuation volume of the D type magneto-optical optical attenuation element. As shown in FIG. 3, the D type magneto-optical optical attenuation element has its peak when the current is low.

FIG. 4 shows the relationship between current and attenuation volume of the I type magneto-optical optical attenuation element. In the I type magneto-optical optical attenuation element, the attenuation volume increases in a roughly proportional manner to the current.

Conventionally, the D type magneto-optical optical attenuation element, which has a large optical attenuation volume when the current is cut, has been used. This is because unnecessary output of optical signals from a device can be prevented, even when the system is down and no control current is supplied to the element.

However, the D type magneto-optical optical attenuation element has the problem of having a characteristic curve that is more complicated than that of the I type magneto-optical optical attenuation element, thus making control difficult.

Also, the D type magneto-optical optical attenuation element has a peak in its characteristic curve, which varies depending on the temperature and is different from element to element. This creates the further problem of making accurate control difficult.

SUMMARY OF THE INVENTION

An object of the present invention is to provide an optical attenuation device that is easy to control.

Another object of the present invention is to provide an optical sending device wherein the transmission of a uniform light is possible with simple control.

Objects and advantages of the present invention are achieved by providing an optical attenuation device. The optical attenuation device comprises an optical attenuation unit including at least two different type magneto-optical optical attenuation elements coupled in a cascade together, and a current supply unit to supply control current to the optical attenuation unit.

In accordance with embodiments of the present invention, one of the different type magneto-optical optical attenuation elements is a D type magneto-optical optical attenuation element and another of the different type magneto-optical optical attenuation elements is an I type magneto-optical optical attenuation element.

In accordance with embodiments of the present invention, one of the different type magneto-optical optical attenuation elements comprises a faraday rotator, a polarizer and an analyzer. The polarizer has a polarization direction which is 90 degrees with respect to a polarization direction of the analyzer. Another of the different type magneto-optical optical attenuation elements comprises a faraday rotator, a polarizer and an analyzer. The polarizer has a polarization direction which is parallel with a polarization direction of the analyzer.

In accordance with embodiments of the present invention, one of the different type magneto-optical optical attenuation elements is a magneto-optical optical attenuation element having a peak attenuation volume when a control current for the magneto-optical optical attenuation element is low, and another of the different type magneto-optical optical attenuation elements have an attenuation volume which increases in an approximately proportional manner to a drive current for the magneto-optical optical attenuation element.

In accordance with embodiments of the present invention, the optical attenuation device further comprises a housing housing the attenuation unit.

Objects and advantages of the present invention are achieved by providing an optical attenuation device. The optical attenuation device comprises a first magneto-optical optical attenuation element to attenuate an optical signal to output an attenuated optical signal, and a second magneto-optical optical attenuation element to attenuate the attenuated optical signal output from the first magneto-optical optical attenuation elements. The first magneto-optical optical attenuation element and the second magneto-optical optical attenuation element are different types.

Objects and advantages of the present invention are achieved by providing an optical sending device. The optical sending device comprises an optical attenuation unit including at least two different type magneto-optical optical attenuation elements coupled in a cascade together, a light being attenuated by the at least two different type magneto-optical optical attenuation elements, and a control unit to control attenuation characteristics of the optical attenuation unit to conform to a prescribed characteristic.

In accordance with embodiments of the present invention, the control unit supplies a constant current to one of the different type magneto-optical optical attenuation elements and controls the current supplied to another of the different type magneto-optical optical attenuation elements such that the attenuation characteristic conforms to a prescribed characteristic.

In accordance with embodiments of the present invention, one of the different type magneto-optical optical attenuation elements is a D type magneto-optical optical attenuation element and another of the different type magneto-optical optical attenuation elements is an I type magneto-optical optical attenuation element.

In accordance with embodiments of the present invention, one of the different type magneto-optical optical attenuation elements comprises a faraday rotator, a polarizer and an analyzer. The polarizer has a polarization direction which is 90 degrees with respect to a polarization direction of the analyzer. Another of the different type magneto-optical optical attenuation elements comprises a faraday rotator, a polarizer and an analyzer. The polarizer has a polarization direction which is parallel with a polarization direction of the analyzer.

In accordance with embodiments of the present invention, one of the different type magneto-optical optical attenuation elements is a magneto-optical optical attenuation element having a peak attenuation volume when a control current for the magneto-optical optical attenuation element is low and another of the different type magneto-optical optical attenuation elements have an attenuation volume which increases in an approximately proportional manner to a drive current for the magneto-optical optical attenuation element. The control unit supplies a constant current which is higher than a current whose attenuation volume has peak to one of the different type magneto-optical optical attenuation elements, and controls the current supplied to another of the different type magneto-optical optical attenuation elements such that the attenuation characteristic conforms to a prescribed characteristic.

In accordance with embodiments of the present invention, the optical sending device further comprises a housing housing the attenuation unit.

Objects and advantages of the present invention are achieved by providing an optical sending device. The optical sending device comprises a plurality of an optical output unit to output light corresponding to the input signal, a plurality of an optical attenuation unit respectively including at least two different type magneto-optical optical attenuation elements coupled in a cascade together, wherein the light output from the output unit is radiated and attenuated, and a control unit to supply a constant current to one of the different type magneto-optical optical attenuation elements first and then control the current supplied to each another of the different type magneto-optical optical attenuation elements in order such that the attenuation characteristic of the optical attenuation unit conforms to a prescribed characteristic.

Objects and advantages of the present invention are achieved by providing an optical sending device. The optical sending device comprises a decoupler to decouple a portion of an optical signal, a first attenuator to attenuate the optical signal having the portion decoupled there from to output an attenuated optical signal, a second attenuator to attenuate the attenuated optical signal output from the first attenuator, and a controller to control attenuation characteristics of at least one of the first attenuator and the second attenuator in accordance with the decoupled portion.

Objects and advantages of the present invention are achieved by providing an optical communication system. The optical communication system comprises a sending device to output an optical signal attenuated by an attenuation unit including at least two different type magneto-optical optical attenuation elements coupled in a cascade together, and a receiving device to receive the attenuated optical signal.

Objects and advantages of the present invention are achieved by providing an optical attenuation method. The optical attenuation method comprises a step of attenuating an optical signal with a first magneto-optical optical attenuation element, a step of attenuating the optical signal attenuated by the first magneto-optical optical attenuation element with a second magneto-optical optical attenuation element, wherein the first magneto-optical optical attenuation element and the second magneto-optical optical attenuation element are different types, and a step of controlling a current provided to the first magneto-optical optical attenuation element and the second magneto-optical optical attenuation element.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
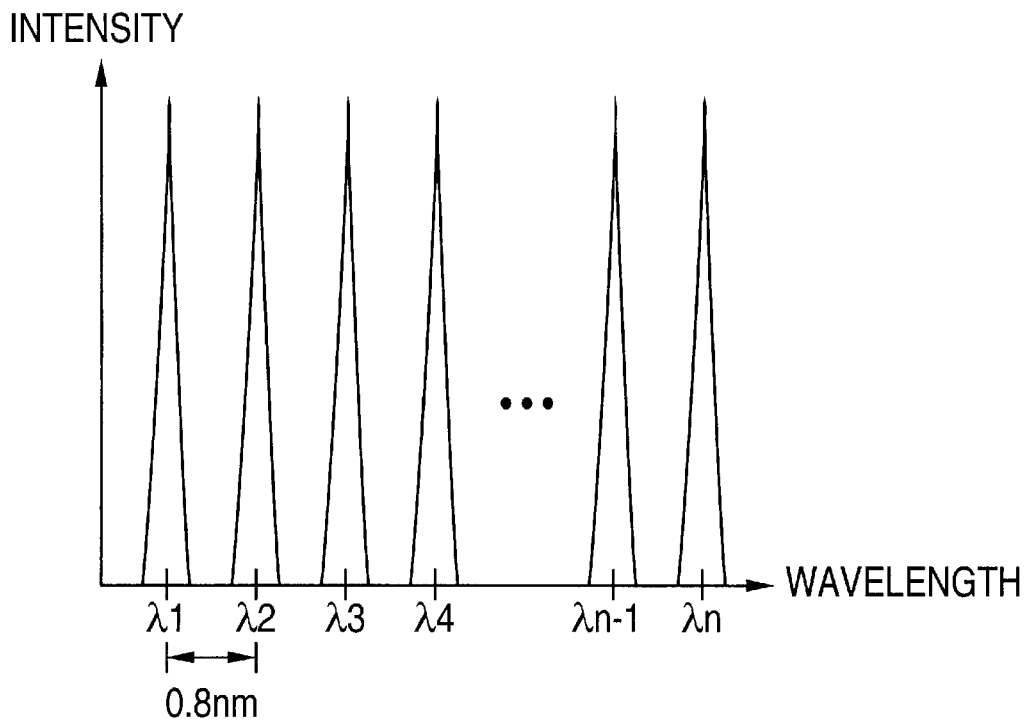
FIG. 1 (prior art) is a graph illustrating the relationship between the wavelength and the intensity of wavelength division multiplexed optical signals.
Figure 2:
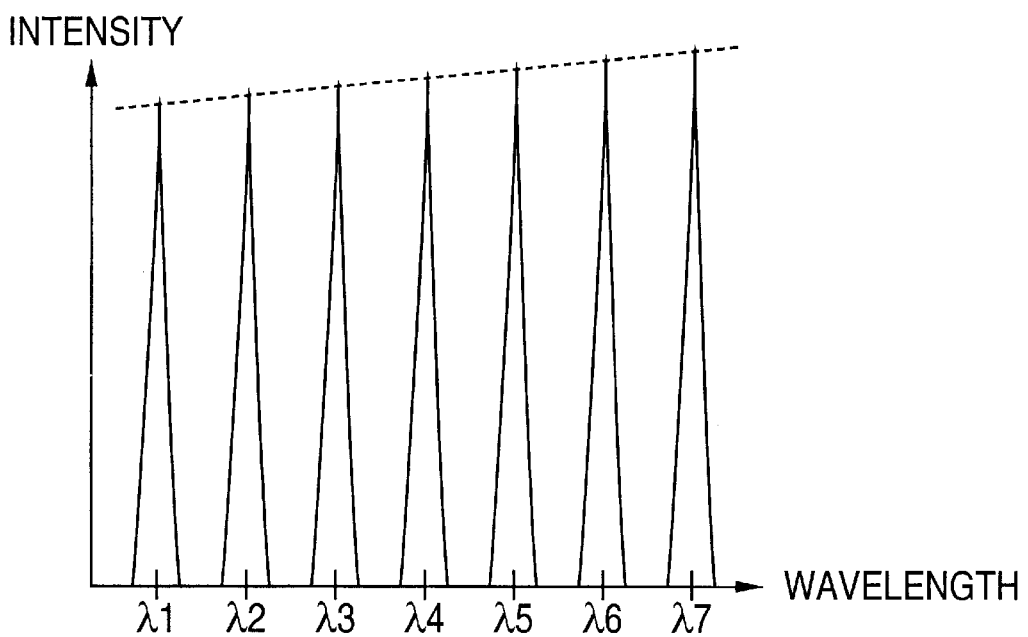
FIG. 2 (prior art) is a graph illustrating one example of pre-emphasis characteristic.
Figure 3:
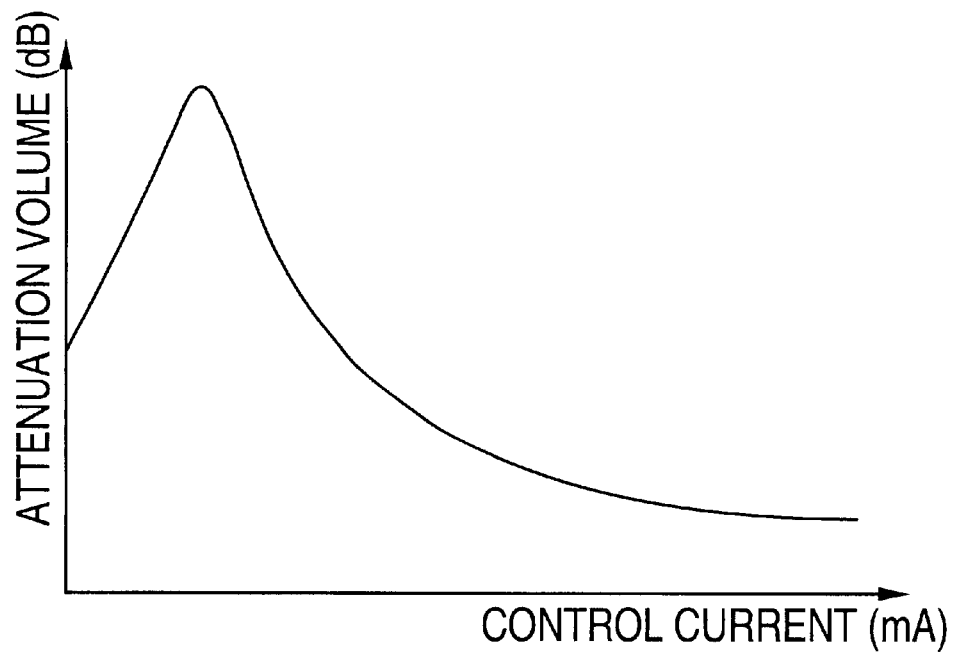
FIG. 3 (prior art) is a graph illustrating the relationship between the current supplied to a D type magneto-optical optical attenuation element and attenuation volume.
Figure 4:
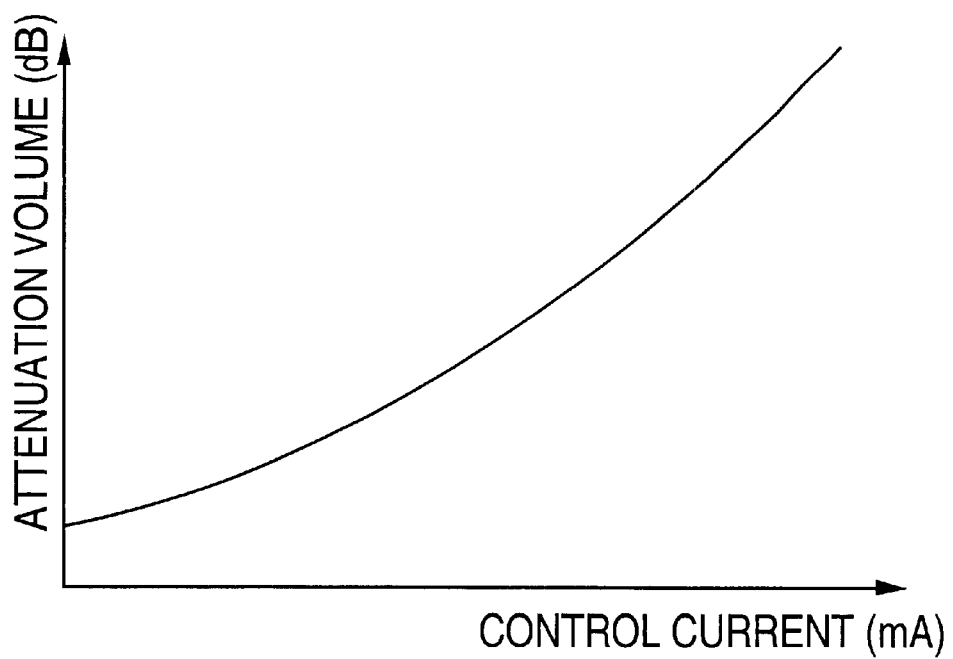
FIG. 4 (prior art) is a graph illustrating the relationship between the current supplied to an I type magneto-optical optical attenuation element and attenuation volume.

Reference will now be made in detail to the preferred embodiments of the present invention, examples of which are illustrated in the accompanying drawings, wherein like reference numerals refer to like elements throughout.

An embodiment of the present invention will be explained using the drawings.

Figure 5:
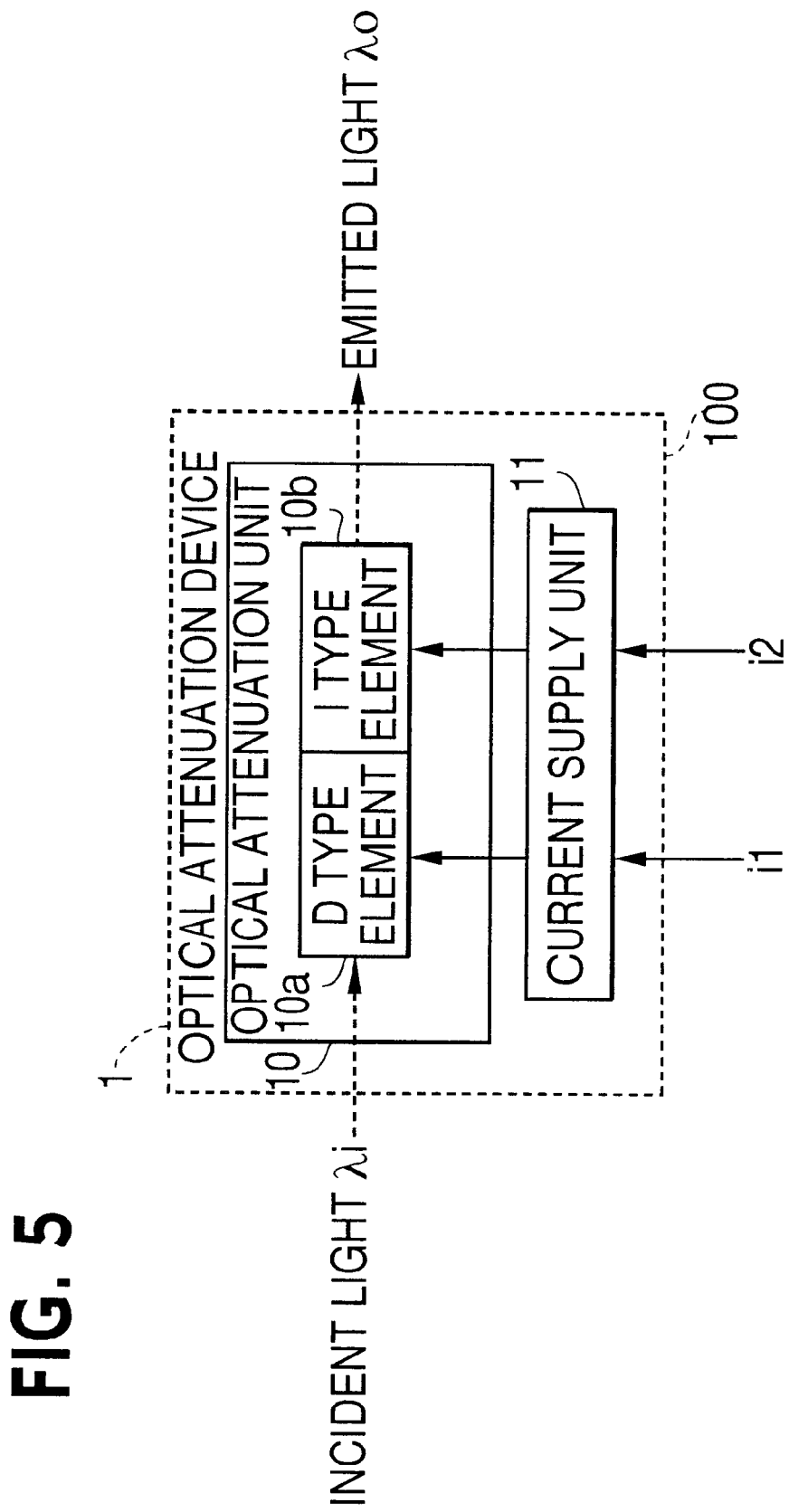
FIG. 5 is a drawing showing a configuration example of an optical attenuation device according to the present invention.

FIG. 5 shows an example of a configuration of an optical attenuation device according to the present invention. As shown in FIG. 5, an optical attenuation device 1 according to the present invention is formed from a optical attenuation unit 10 that attenuates incident light and a current supply unit 11 that supplies current to the optical attenuation unit 10.

The optical attenuation unit 10 is formed from a D type magneto-optical optical attenuation element 10a and an I type magneto-optical optical attenuation element 10b that are coupled by a cascade. Typically, the optical attenuation device 1 is packed as a single optical attenuation unit, with the D type magneto-optical optical attenuation element 10a and the I type magneto-optical optical attenuation element 10b enclosed in the same housing, such as housing 100 in FIG. 5.

Incident light $\lambda i$, after passing through the D type magneto-optical optical attenuation element 10a, passes through the I type magneto-optical optical attenuation element 10b, and is output as emitted light $\lambda o$.

The current supply unit 11 is, for example, a connection terminal, supplying externally input control currents i1 and i2 to the D type magneto-optical optical attenuation element 10a and the I type magneto-optical optical attenuation element 10b composing the optical attenuation unit 10.

Figure 6:
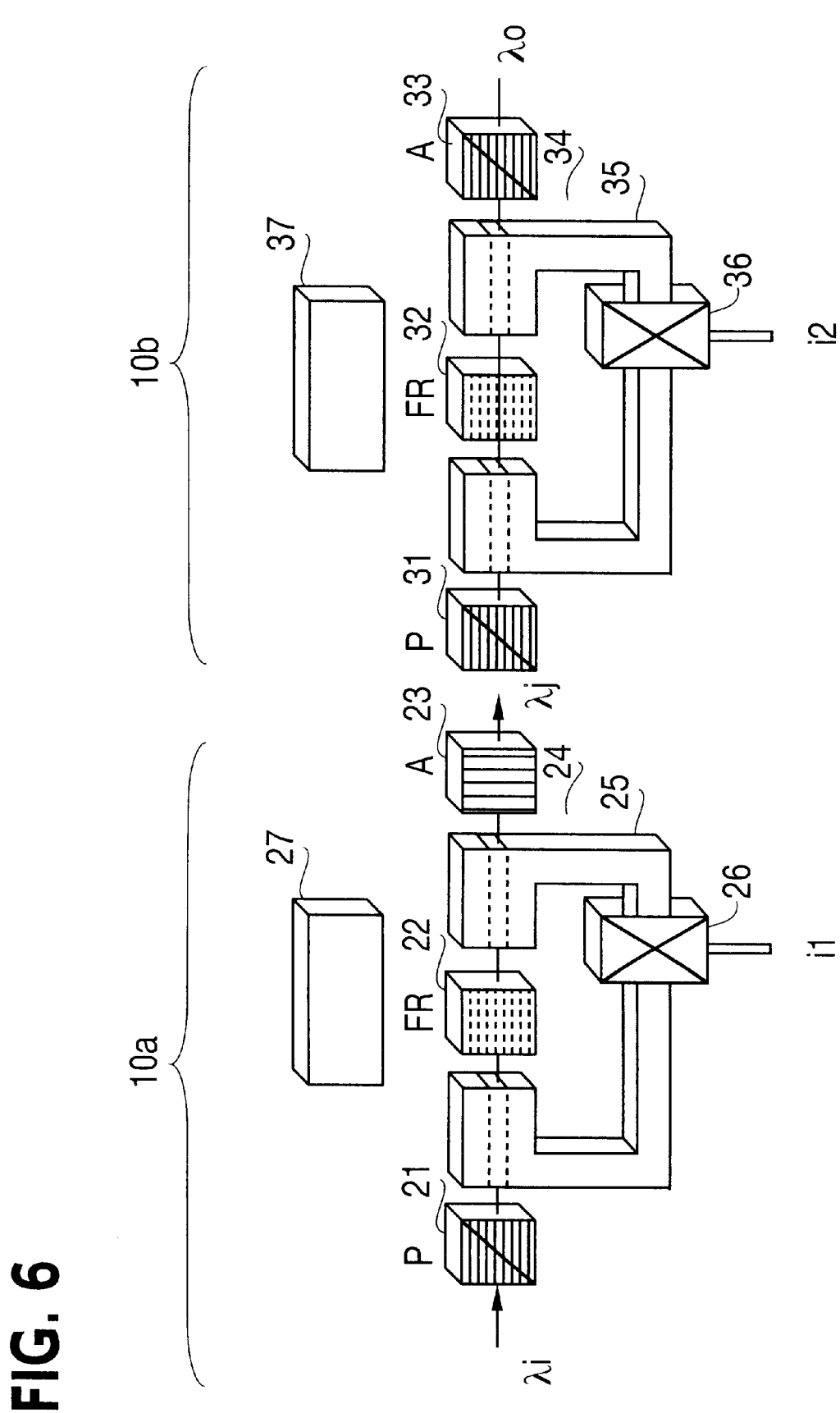
FIG. 6 is a diagram illustrating an optical attenuation device according to the present invention.

FIG. 6 is a diagram illustrating an optical attenuation device according to the present invention. As shown in FIG. 6, the variable optical attenuator includes the D type magneto-optical optical attenuation element 10a and the I type magneto-optical optical attenuation element 10b linked in a cascade. Both elements used in the present invention are disclosed in FIGS. 1 to 5 of U.S. Pat. No. 5,867,300 which is incorporated herein by reference.

The D type element 10a is formed from a polarizer (P) 21, a Faraday element (FR) 22, and an analyzer (A) 23. Faraday element 22 is a magnetooptical element, such as a magneto-optical crystal. Incident light $\lambda i$ is received by, and polarized by, polarizer 21. The polarized incident light $\lambda i$ passes through Faraday element 22 and then analyzer 23. Polarizer 21 and analyzer 23 are constructed so that the polarization direction of the linearly polarized incident light $\lambda i$ as polarized by polarizer 21 is substantially perpendicular to the polarization direction of analyzer 23 when no Faraday rotation is provided by Faraday element 22. The D type element 10a further includes permanent magnet 27 which applies a permanent magnetic field to Faraday element 22 and an electromagnet 24 formed from a yoke 25 and a coil 26. The magnitude of the magnetic field applied by electromagnet 24 can be varied by changing a current "i1" applied to coil 26. The variable magnetic field applied by electromagnet 24 is parallel to the light path of incident light $\lambda i$ as incident light $\lambda i$ travels through Faraday element 22.

The I type element 10b is formed from a polarizer (P) 31, a Faraday element (FR) 32, and an analyzer (A) 33. Faraday element 32 is a magnetooptical element, such as a magnetooptical crystal. Incident light $\lambda j$ output from the D type element 10a is received by, and polarized by, polarizer 31. The polarized incident light $\lambda j$ passes through Faraday element 32 and then analyzer 33. Polarizer 31 and analyzer 33 are constructed so that the polarization direction of the linearly polarized incident light $\lambda j$ as polarized by polarizer 31 is substantially parallel to the polarization direction of analyzer 33 when no Faraday rotation is provided by Faraday element 32. The I type element 10b further includes permanent magnet 37 which applies a permanent magnetic field to Faraday element 32 and an electromagnet 34 formed from a yoke 35 and a coil 36. The magnitude of the magnetic field applied by electromagnet 34 can be varied by changing a current "i2" applied to coil 36. The variable magnetic field applied by electromagnet 34 is parallel to the light path of incident light $\lambda j$ as incident light $\lambda j$ travels through Faraday element 32.

Next, the operations of the D type element 10a will be explained. The operations of the I type element 10b are the same as that of the D type element 10a.

The magnetic field applied by permanent magnet 27(37) should be large enough to integrate magnetic domains inside Faraday element 22(32) into a single domain. As a result, the composite magnetic field created by permanent magnet 27(37) and electromagnet 24(34) is so large that a loss of incident light $\lambda i$, $\lambda j$ inside Faraday element 22(32) is relatively small. Analyzer 23(33) has a corresponding polarization direction, and receives the polarization rotated incident light $\lambda i$, $\lambda j$ from Faraday element 22(32). When the polarization direction of the polarization rotated incident light $\lambda i$, $\lambda j$ does not agree with the polarization direction of analyzer 23(33), a portion or the entirety of incident light $\lambda i$, $\lambda j$ is blocked by analyzer 23(33), to thereby attenuate incident light $\lambda i$, $\lambda j$.

Figure 7:
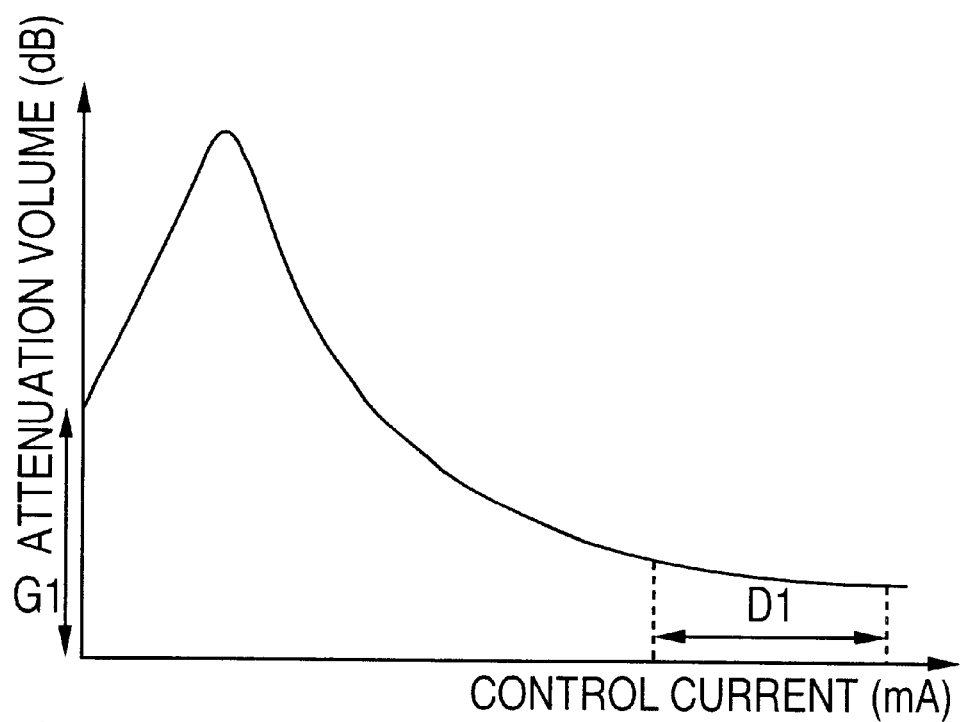
FIG. 7 is a graph illustrating the operations of the D type magneto-optical optical attenuation element shown in FIG. 6.
Figure 8:
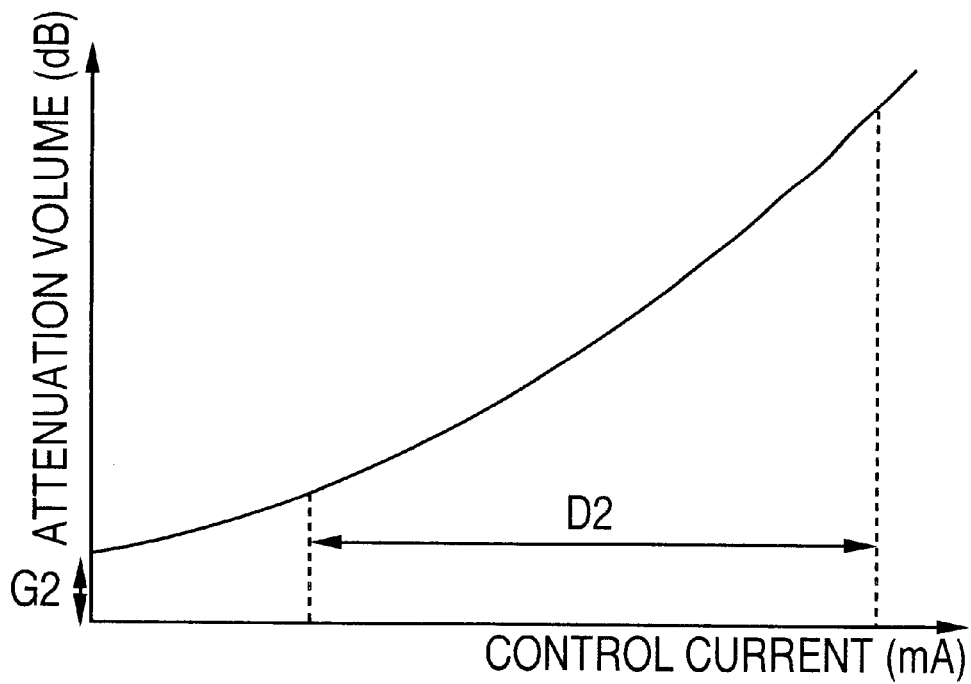
FIG. 8 is a graph illustrating the operations of the I type magneto-optical optical attenuation element shown in FIG. 6.

FIGS. 7 and 8 are graphs illustrating the operations of the embodiment shown in FIG. 6.

FIG. 7 is a graph illustrating the operations of the D type magneto-optical optical attenuation element 10a shown in FIG. 6. As shown in FIG. 7, the D type element has its peak in the region where the current is low. Thus the range of control current i1 during operation is set within current region D1, which is higher than the peak. In order to make the control simpler, this control current i1 is a constant value.

FIG. 8 is a graph illustrating the operations of the I type magneto-optical optical attenuation element 10b shown in FIG. 6. As shown in FIG. 8, the I type element has a characteristic that is close to linear. Thus for the range of control current i2 during operation, region D2 can be used, which is broader than in the case of the D type element. The attenuation volume control is performed by varying the current i2 supplied to this I type element.

Therefore, when the optical attenuation device is in operation, by transmitting a prescribed current that corresponds to the attenuation characteristic of the I type magneto-optical optical attenuation element 10b as shown in FIG. 8, the attenuation characteristic of the entire device can be controlled, thus making control simpler than when the conventional D type element is used alone.

However, in the embodiment described above, when the supply of the external control currents i1 and i2 are cut, the D type element has an attenuation volume G1 when there is no current, as shown in FIG. 7. The I type element has an attenuation volume G2 when there is no current, as shown in FIG. 8. Thus when there is no current, the attenuation volume for the entire device is the sum of these two, namely G1+G2.

Thus roughly the same attenuation volume can be obtained as when the convention D type element is used by itself. So even if some kind of malfunction were to occur in a system using the I type magneto-optical optical attenuation element and the control current were to be cut off, the output of unnecessary optical signals by the system can be prevented.

Figure 9:
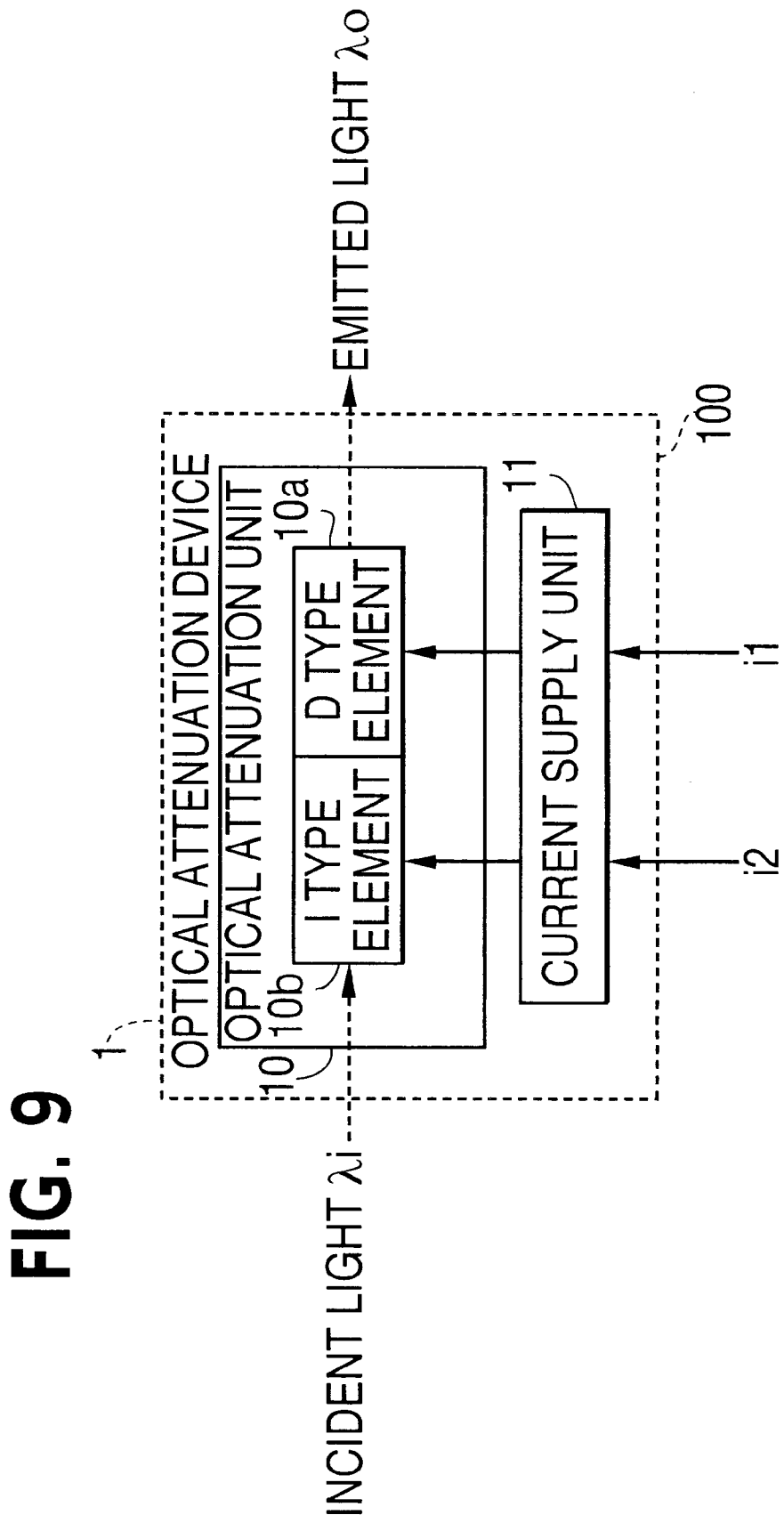
FIG. 9 is a drawing showing another configuration example of an optical attenuation device according to the present invention.

In the embodiment above, the incident light first passes through the D type magneto-optical optical attenuation element 10a and then passes through the I type magneto-optical optical attenuation element 10b. As shown in FIG. 9, the position of the D type element and the I type element may be reversed. In this embodiment, the position of the elements is reversed from FIG. 5, but the remaining configuration is the same. The same effects can be gained from this type of embodiment as with the embodiment described above.

Also, in the above embodiment, a combination of one D type element and one I type element has been used, but a combination of a plurality of elements may also be used. For example, a combination of two D type elements and one I type element may be used. In that case, the attenuation volume would be 2×G1 when the control current is shut off, thus improving the ability to cut off unnecessary optical signals.

Figure 10:
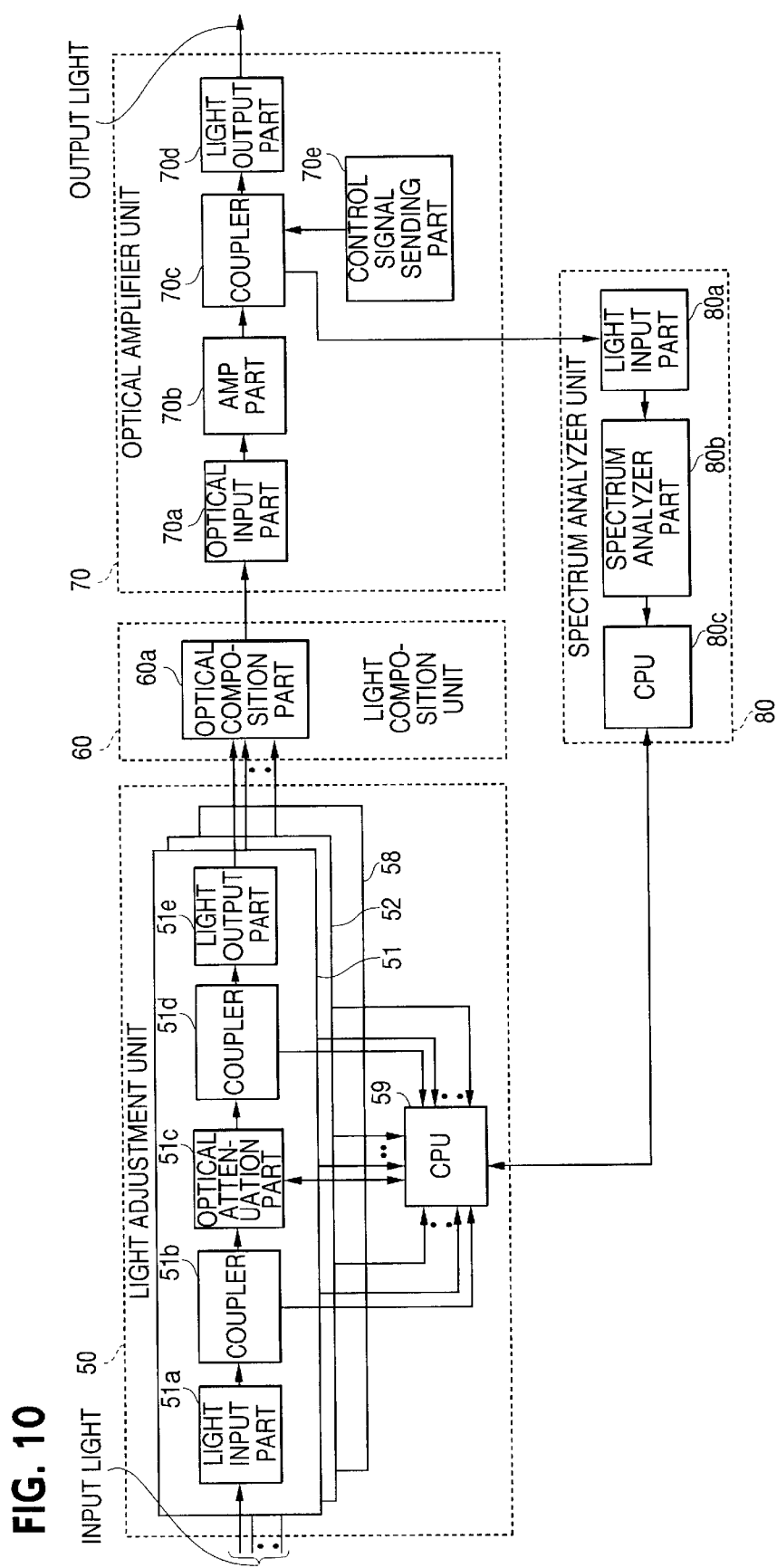
FIG. 10 is a block diagram illustrating a detailed configuration example of an optical sending device according to the present invention.

FIG. 10 is a block diagram illustrating a detailed configuration example of an optical sending device according to the present invention. Referring to FIG. 10, an explanation will be made of one example of a configuration of an optical sending device according to the present invention. In this embodiment, a WDM optical transmitter is shown as an example of a configuration of an optical sending device. An optical sending device is a device that outputs optical signals that correspond to input optical signals or electrical signals. Some examples are optical transmitters and optical repeaters.

As shown in FIG. 10, the optical transmitter in this embodiment includes a light adjustment unit 50, a light composition unit 60, an optical amplifier unit 70, and a spectrum analyzer unit 80.

The light adjustment unit 50 receives the optical signals of eight types of differing wavelengths modulated according to the information they are to transmit (optical signals modulated by WDM), uniforms their power and performs pre-emphasis. The light composition unit 60 synthesizes the eight types of optical signals whose power have been adjusted. An optical amplifier unit 70 amplifies at a prescribed gain the synthesized lights. A spectrum analyzer unit 80 analyzes the frequency of the optical signal output by the optical amplifier unit 70, determines whether or not each wavelength has its prescribed power, and notifies the light adjustment unit 50 of the results of that determination.

The light adjustment unit 50 includes eight individual units 51 through 58 corresponding to the optical signals of the eight types of differing wavelengths, although only individual unit 51 is shown in detail in FIG. 10 to simplify the figure. The configurations of the individual units are the same, so the explanation will be made using the example of the individual unit 51.

The individual unit 51 includes a light input part 51a, a coupler 51b, an optical attenuation part 51c, a coupler 51d, a light output part 51e.

Optical signals modulated according to the information they are to transmit are input into the light input part 51a.

The coupler 51b branches one section of the incident light. Then the coupler 51b radiates this into a photodiode (to be discussed below), and generates an electrical signal proportional to the power of the incident light. The coupler 51b also transmits the remaining major portion of the light, supplying it to the optical attenuation part 51c.

The optical attenuation part 51c, as with the drawing of FIG. 5, is formed from D type and I type magneto-optical optical attenuation elements (to be described in detail later). The optical attenuation part 51c attenuates the optical signals emitted from the coupler 51b at a prescribed attenuation volume and outputs them.

The coupler 51d branches one section of the light signal emitted from the optical attenuation 51c. Then the coupler 51d radiates this into a photodiode to be discussed below, and generates an electrical signal proportional to the power of the emitted light. The coupler 51d also transmits the remaining major portion of the light, supplying it to the light output part 51e.

Optical signals whose power has been modulated are output from the light output part 51e.

A CPU 59 refers to detection signals output by the spectrum analyzer unit 80 and the individual units 51 through 58 and controls the attenuation volume of optical attenuators 51c through 58c (not shown in the figure.)

Figure 11:
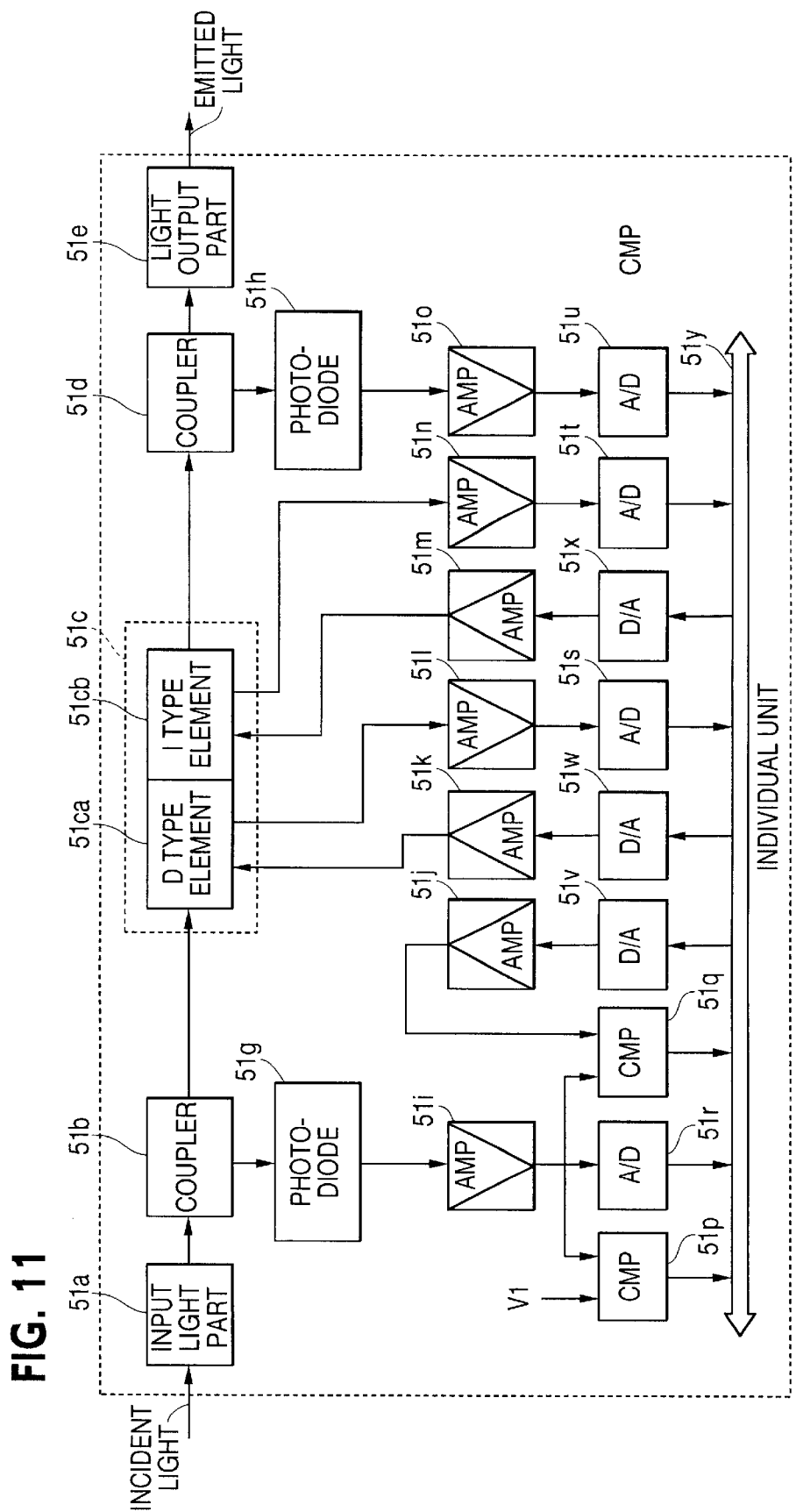
FIG. 11 is a block diagram illustrating a detailed configuration example of an individual unit shown in FIG. 10.

FIG. 11 is a block diagram showing a detailed example configuration of the individual unit 51.

As shown in FIG. 11, the individual unit 51 includes a light input part 51a, a coupler through 51o, comparators 51p and 51q, A/D converters 51r through 51u, D/A converters 51v through 51x, and bus 51y. In FIG. 11, parts that correspond to parts in FIG. 10 use the same designators, and so no explanation of them will be given here.

The optical attenuation part 51c is formed from the D type magneto-optical optical attenuation element 51ca and the I type magneto-optical optical attenuation element 51cb linked in a cascade.

The photodiode 51g converts the optical signals branched by the coupler 51b (optical signals before radiation into the optical attenuation part 51c) into electrical signals and outputs the same.

The photodiode 51h converts the optical signals branched by the coupler 51d (optical signals that have passed through the optical attenuation part 51c) into electrical signals and outputs the same.

The AMP 51i amplifies at a prescribed gain the output signals from the photodiode 51g (electrical signals in proportion to the optical signals branched by the coupler 51b) and outputs the same.

The AMP 51o amplifies at a prescribed gain the output signals from the photodiode 51h (electrical signals in proportion to the optical signals branched by the coupler 51d) and outputs the same.

The comparator 51p compares the reference voltage V1 and the output voltage. When the output voltage of the AMP 51i is lower than the reference voltage V1, the prescribed output signal is generated and output externally. When the light incident on the individual unit 51 is cut off, the comparator 51 detects this and notifies a prescribed external device thereof.

The A/D converter 51r uses A/D conversion to convert the output of the AMP 51i into digital signals. The output signals are supplied via the bus 51y to the CPU 59.

The comparator 51q compares the output voltage (this voltage is set by CPU 59) amplified at a prescribed gain by the AMP 51j after outputting from the D/A converter 51v to the output voltage from AMP 51i. When the output of the AMP 51i is lower, the comparator 51q outputs a prescribed signal. In other words, the comparator 51q notifies CPU when the voltage proportional to the light output from the AMP 51i and input into the individual unit 51 is lower than a prescribed level.

The D/A converter 51w converts the digital signal supplied from CPU 59 (control signal) into a corresponding analog signal and outputs the same.

The AMP 51k amplifies the analog signal output from the D/A converter 51w at a prescribed gain and outputs the same to the D type magneto-optical optical attenuation element 51ca.

The AMP 51l amplifies the current flowing in the D type magneto-optical optical attenuation element 51ca at a prescribed gain and outputs the same.

The A/D converter 51s uses A/D conversion to convert the output of the AMP 51l into digital signals and outputs the same.

The D/A converter 51x converts the digital signal supplied from CPU 59 (control signal) into a corresponding analog signal and outputs the same.

The AMP 51m amplifies the analog signal output from the D/A converter 51x at a prescribed gain and outputs the same to the I type magneto-optical optical attenuation element 51cb.

The AMP 51n amplifies the current flowing in the I type magneto-optical optical attenuation element 51cb at a prescribed gain and outputs the same.

The A/D converter 51t uses A/D conversion to convert the output of the AMP 51n into digital signals and outputs the same.

The A/D converter 51u uses A/D conversion to convert the signals output from the amp 51o into corresponding digital signals and outputs the same.

The bus 51y connects the comparators 51p and 51g, the A/D converters 51r through 51u and the D/A converters 51v through 51x with the CPU 59, thus making possible the transmission of data therebetween.

Returning to FIG. 10, the light composition unit 60 includes a light composition unit 60a.

The light composition unit 60a synthesizes the optical signals of prescribed wavelengths output respectively from the individual units 51 through 58 of the light adjustment unit 50 and outputs them as a single optical signal.

The optical amplifier unit 70 includes a light input part 70a, an amp part 70b, a coupler 70c, a light output unit 70d, and a control signal sending part 70e.

The light input part 70a radiates the optical signal that has been emitted from the light composition unit 60.

The AMP part 70b amplifies at the prescribed gain the optical signals input via the light input part 70a and emits the same.

Optical signals amplified by the AMP part 70b are radiated into the coupler 70c. A section thereof is separated and input into the spectrum analyzer unit 80. The monitor control signal supplied from the control signal sending part 70e is superimposed and emitted to the light output unit 70d.

The light output unit 70d outputs the optical signal from the coupler 70c as output light.

The control signal sending part 70e outputs a signal for monitor and control and supplies it to the coupler 70c.

The spectrum analyzer unit 80 includes a light input part 80a, a spectrum analyzer part 80b, and a CPU 80c.

The optical signal separated by the coupler 70c of the optical amplifier unit 70 is input to the light input part 80a.

The spectrum analyzer part 80b performs frequency analysis of the optical signals input from the light input part 80a (optical signals based on WDM) and computes the light power for each frequency region.

The CPU 80c, after performing a prescribed processing for the analysis results of the spectrum analyzer part 80b, notifies it to the light adjustment unit 50.

Next, an explanation will be given for the operations of the above embodiment.

The optical signals of the eight types of differing wavelengths modulated according to the information they are to transmit are input respectively into the individual units 51 through 58 of the light adjustment unit 50, where the light power is adjusted.

Figure 12:
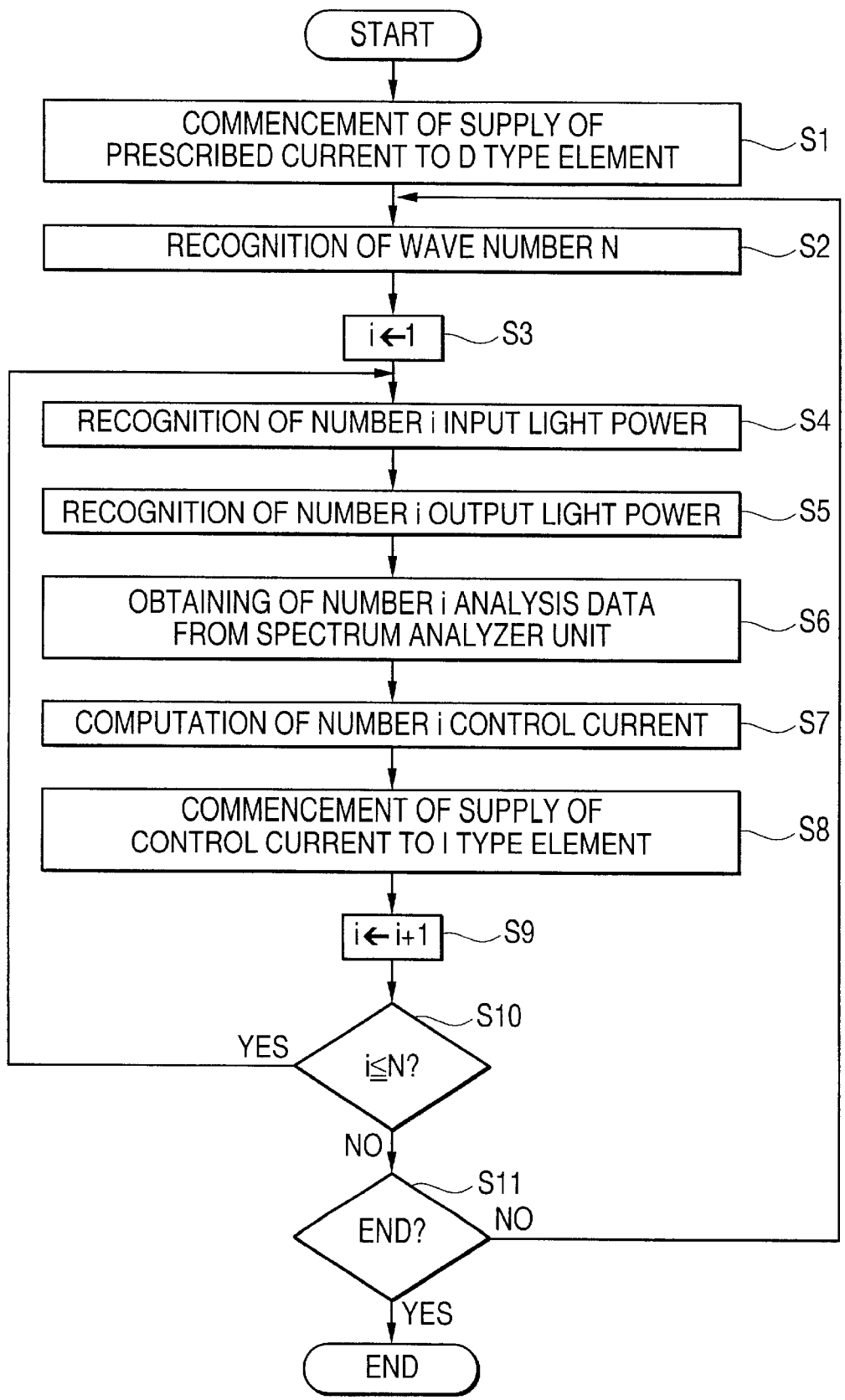
FIG. 12 is a flow chart illustrating one example of the processing executed in the optical adjustment unit shown in FIG. 10.

FIG. 12 is a flow chart illustrating one example of the processing executed in the light adjustment unit 50. This flow chart is the processing executed when electricity is supplied to a device. When this flow chart commences, the following processing is executed.

Step S1: The CPU 59 supplies a prescribed control current to the D type magneto-optical optical attenuation element of each individual unit. The current value is set at the range for the region D1 shown in FIG. 7.

Step S2: The CPU 59 recognizes the wave number N of the input light. In other words, the CPU 59 recognizes the number of input lights actually input from among the eight types of input light.

Step S3: The CPU 59 sets an initial value of "1" to the variable i.

Step S4: The CPU 59 refers to the output signal from the input side coupler of the number i individual unit (for the individual unit 51, coupler 51b) and recognizes the power of the number i input light.

Step S5: The CPU 59 refers to the output signal from the output side coupler of the number i individual unit (for the individual unit 51, coupler 51 d) and recognizes the power of the number i output light.

Step S6: The CPU 59 obtains the number i analysis data which is the analysis results of the output light from the number i individual unit output from the spectrum analyzer unit 80.

Step S7: The CPU 59 refers to the light power of the number i input/output light and to the number i analysis data, to compute the current value of the control current to be supplied to the I type magneto-optical optical attenuation element of the number i individual unit.

Step S8: The CPU 59 commences the supply of the computed control current to the I type magneto-optical optical attenuation element of the number i individual unit.

Step S9: The CPU 59 adds an increment of only "1" to the variable i.

Step S10: If the value of the variable i is lower than the wave number N, the CPU 59 returns to step S4. In all other cases operations proceed to step S11.

Step S11: If, for example, the processing is to be ended because the power supply has been cut or some similar reason, the CPU 59 ends the processing (end). In all other cases the CPU 59 returns to step S2 and the same processing is repeated.

Through the above processing, the output light from each individual unit is set such that it has a prescribed power.

In this manner, the eight types of light signals whose power has been adjusted are synthesized by the light composition unit 60 and output as a single stream.

The optical amplifier unit 70 amplifies at a prescribed gain the optical signals synthesized by the light composition unit 60 and outputs them. A section of the optical signals amplified by the AMP unit 70b of the optical amplifier unit 70 is supplied to the spectrum analyzer unit 80 as a monitor light, and the power of each wavelength component is analyzed by this spectrum analyzer unit 80 and fed back to the light adjustment unit 50. Thus control is performed such that the level of output light is always constant.

Figure 13:
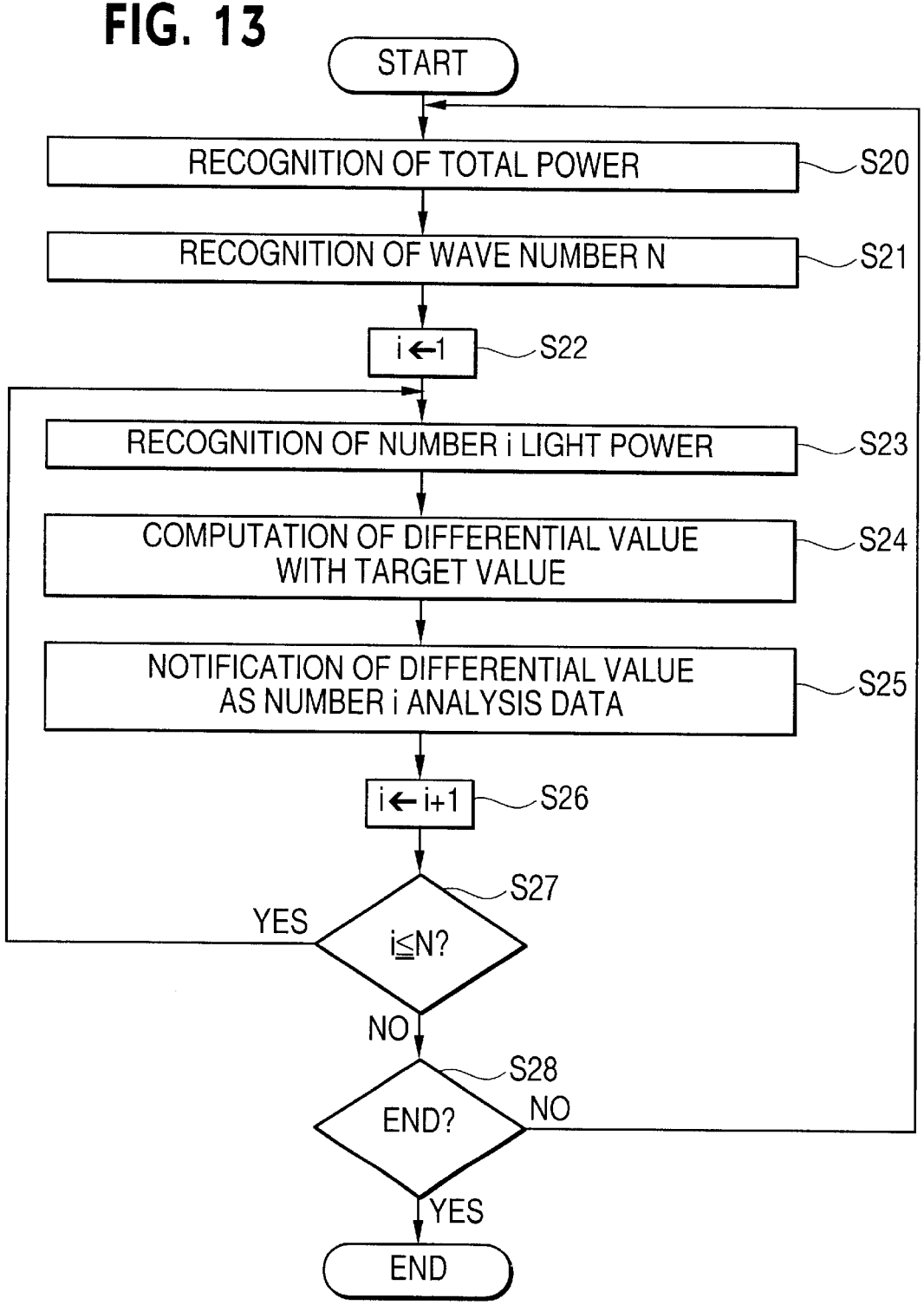
FIG. 13 is a flow chart illustrating one example of the processing executed in the spectrum analyzer unit shown in FIG. 10.

FIG. 13 is a flow chart illustrating one example of the processing executed in the spectrum analyzer unit shown in FIG. 10. Next, referring to FIG. 13, an explanation will be given of one example of the processing executed by the spectrum analyzer unit 80. This processing commences when electricity is supplied to a device. When this flow chart commences, the following processing is executed.

Step S20: The CPU 80c refers to the output from the spectrum analyzer part 80b and recognizes the total power of the light of all the wavelengths.

Step S21: The CPU 80c refers to the output from the spectrum analyzer part 80b and recognizes the wave number N of the output lights currently being output.

Step S22: The CPU 80c sets an initial value of "1" to the variable i.

Step S23: The CPU 80c refers to the output from the spectrum analyzer part 80b and recognizes the light power of the optical signals output from the number i individual unit.

Step S24: The CPU 80c computes the differential value between the power of the optical signal output from the number i individual unit and the target value.

Step S25: The CPU 80c notifies the CPU 59 of the light adjustment unit 50 of the differential value computed in step S24 as the number i analysis data.

Step S26: The CPU 80c adds an increment of only "1" to the variable i.

Step S27: If the value of the variable i is lower than the wave number N, the CPU 80c returns to step S23. In all other cases operations proceed to step S28.

Step S28: If, for example, the processing is to be ended because the power supply has been cut or some similar reason, the CPU 80c ends the processing (end). In all other cases operations return to step S20 and the same processing is repeated.

With the above processing, the power of each wavelength included in the output light can be computed, and light adjustment unit 50 notified thereof.

Figure 14:
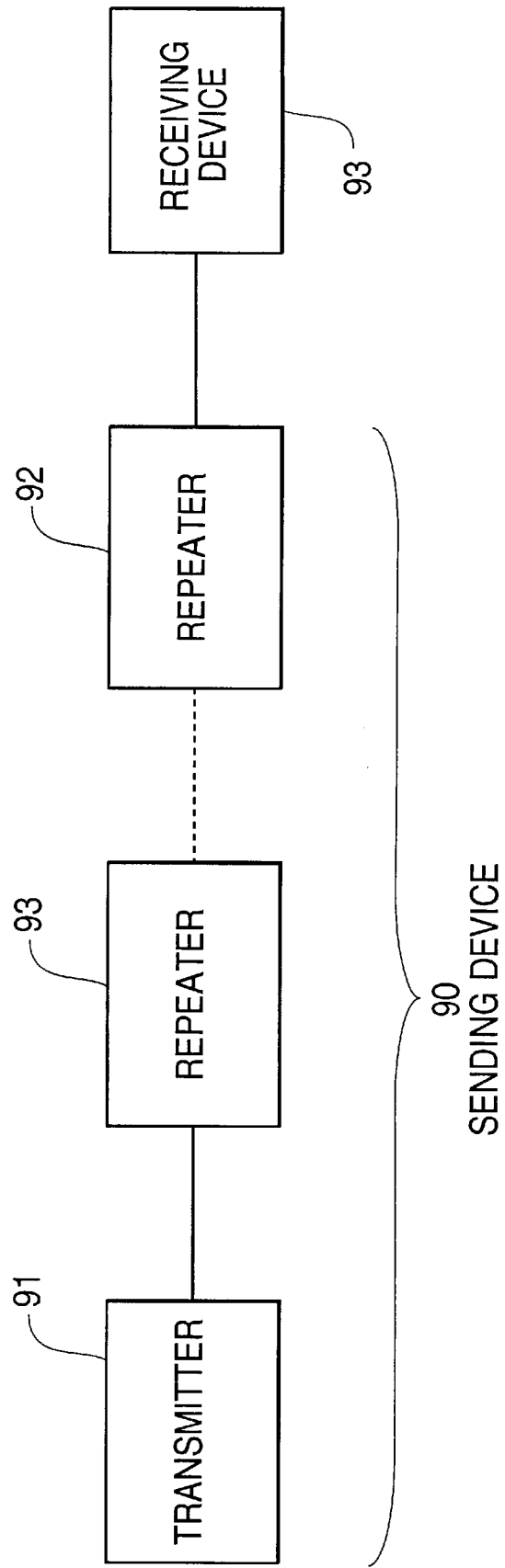
FIG. 14 is a block diagram illustrating an optical communication system according to the present invention.

FIG. 14 is a block diagram illustrating an optical communication system according to the present invention. As shown in FIG. 14, an optical communication system comprises a sending device 90 and a receiving device 93. The sending device 90 includes a transmitter 91 and a plurality of repeaters 92. The construction of the transmitter 91 or repeaters 92 is the same as above illustrated in embodiment. The sending device 90 outputs an optical signal. The optical signal is attenuated by an attenuation unit including at least two different type magneto-optical optical attenuation elements coupled in a cascade together. The receiving device 93 receives the attenuated optical signal.

According to the present invention as explained above, an optical attenuation device that attenuates the intensity of incident light and outputs them has an optical attenuation unit comprising a D type magneto-optical optical attenuation element and an I type magneto-optical optical attenuation element linked in a cascade and a current supply unit that supplies control current to the optical attenuation unit. Thus the attenuation characteristic can be adjusted through simple control.

Also, an optical transmission device that outputs optical signals corresponding to input signals has an output unit that outputs light corresponding to input signals, and an optical attenuation unit formed from a D type magneto-optical optical attenuation element and an I type magneto-optical optical attenuation element linked in a cascade, into which light output from the output unit is radiated and attenuated, and a control unit that controls such that the attenuation characteristic of the attenuation unit has a prescribed characteristic. Thus even when a malfimction occurs, the external output of unnecessary optical signals can be prevented with certainty.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An optical attenuation device, comprising:
   an optical attenuation unit including at least two different type magneto-optical optical attenuation elements coupled in a cascade together, the magneto-optical optical attenuation elements having different attenuation characteristic curves to thereby be different type magneto-optical optical attenuation elements; and
   a current supply unit to supply control current to the magneto-optical optical attenuation elements, the current being supplied to one of the magneto-optical optical attenuation elements being controlled so that the attenuation characteristic of the respective magneto-optical optical attenuation element conforms to a prescribed characteristic.

2. The optical attenuation device as recited in claim 1, wherein
   one of the different type magneto-optical optical attenuation elements is a D type magneto-optical optical attenuation element and another of the different type magneto-optical optical attenuation elements is an I type magneto-optical optical attenuation element.

3. The optical attenuation device as recited in claim 1, wherein one of the different type magneto-optical optical attenuation elements comprises a faraday rotator, a polarizer and an analyzer, the polarizer having a polarization direction which is 90 degrees with respect to a polarization direction of the analyzer, and another of the different type magneto-optical optical attenuation elements comprises a faraday rotator, a polarizer and an analyzer, the polarizer having a polarization direction which is parallel with a polarization direction of the analyzer.

4. The optical attenuation device as recited in claim 1, wherein one of the different type magneto-optical optical attenuation elements is a magneto-optical optical attenuation element having a peak attenuation volume when a control current for the respective magneto-optical optical attenuation element is low, and another of the different type magneto-optical optical attenuation elements has an attenuation volume which increases in an approximately proportional manner to a control current for the respective magneto-optical optical attenuation element.

5. The optical attenuation device as recited in claim 1, further comprising:

a housing housing the attenuation unit.

6. An optical attenuation device, comprising:

a first magneto-optical optical attenuation element to attenuate an optical signal to output an attenuated optical signal; and a second magneto-optical optical attenuation element to attenuate the attenuated optical signal output from the first magneto-optical optical attenuation element, wherein one of the first and second magneto-optical optical attenuation elements has a larger optical attenuation volume when a control current to said one of the first and second magneto-optical optical attenuation elements is cut as compared to an optical attenuation volume of the other of the first and second magneto-optical optical attenuation elements when a control current to said other of the first and second magneto-optical optical attenuation elements is cut, and said other of the first and second magneto-optical optical elements has an attenuation volume which increases in an approximately proportional manner to the control current to said other of the first and second magneto-optical optical attenuation elements.

7. An optical sending device, comprising:

an optical attenuation unit including at least two different type magneto-optical optical attenuation elements coupled in a cascade, a light being attenuated by the at least two different type magneto-optical optical attenuation elements, the magneto-optical optical attenuation elements having different attenuation characteristic curves to thereby be different type magneto-optical optical attenuation elements; and a control unit to control attenuation characteristics of one of said at least two different type magneto-optical optical attenuation elements to conform to a prescribed characteristic.

8. An optical sending device comprising:

an optical attenuation unit including at least two different type magneto-optical optical attenuation elements coupled in a cascade, a light being attenuated by the at least two different type magneto-optical optical attenuation elements, the magneto-optical optical attenuation elements having different attenuation characteristic curves to thereby be different type magneto-optical optical attenuation elements; and a control unit to control attenuation characteristics of the optical attenuation unit to conform to a prescribed characteristic, wherein the control unit supplies a constant control current to one of the different type magneto-optical optical attenuation elements and controls a control current supplied to another of the different type magneto-optical optical attenuation elements such that the attenuation characteristic conforms to a prescribed characteristic.

9. The optical sending device as recited in claim 8, wherein one of the different type magneto-optical optical attenuation elements is a D type magneto-optical optical attenuation element and another of the different type magneto-optical optical attenuation elements is an I type magneto-optical optical attenuation element.

10. The optical sending device as recited in claim 8, wherein one of the different type magneto-optical optical attenuation elements comprises a faraday rotator, a polarizer and an analyzer, the polarizer having a polarization direction which is 90 degrees with respect to a polarization direction of the analyzer, and another of the different type magneto-optical optical attenuation elements comprises a faraday rotator, a polarizer and an analyzer, the polarizer having a polarization direction which is parallel with a polarization direction of the analyzer.

11. The optical sending device as recited in claim 8, further comprising:

a housing housing the optical attenuation unit.

12. An optical sending device comprising:

an optical attenuation unit including at least two different type magneto-optical optical attenuation elements coupled in a cascade, a light being attenuated by the at least two different type magneto-optical optical attenuation elements, the magneto-optical optical attenuation elements having different attenuation characteristic curves to thereby be different type magneto-optical optical attenuation elements; and a control unit to control attenuation characteristics of the optical attenuation unit to conform to a prescribed characteristic, wherein one of the different type magneto-optical optical attenuation elements is a magneto-optical optical attenuation element having a peak attenuation volume when a control current for the respective magneto-optical optical attenuation element is low and another of the different type magneto-optical optical attenuation elements has an attenuation volume which increases in an approximately proportional manner to a control current for the respective magneto-optical optical attenuation element, and the control unit supplies a constant control current to one of the different type magneto-optical optical attenuation elements, and controls the control current supplied to another of the different type magneto-optical optical attenuation elements such that the attenuation characteristics of the optical attenuation unit conform to the prescribed characteristic.

13. The optical sending device as recited in claim 12, further comprising:

a housing housing the optical attenuation unit.

14. An optical sending device to output optical signals, which transmit a plurality of lights with differing wavelengths, that correspond to an input signal, comprising:

a plurality of an optical output unit to output light corresponding to the input signal;

a plurality of an optical attenuation unit respectively including at least two different type magneto-optical optical attenuation elements coupled in a cascade, wherein the magneto-optical optical attenuation elements have different attenuation characteristic curves to thereby be different type magneto-optical optical attenuation elements, and the light output from the output unit is radiated and attenuated; and a control unit to supply a constant control current to one of the different type magneto-optical optical attenuation elements first and then control a control current supplied to each another of the different type magneto-optical optical attenuation elements in order such that the attenuation characteristic of the optical attenuation unit conforms to a prescribed characteristic.

15. An optical communication system, comprising:

a sending device to output an optical signal attenuated by an attenuation unit including at least two different type magneto-optical optical attenuation elements coupled in a cascade, the magneto-optical optical attenuation elements having different attenuation characteristic curves to thereby be different type magneto-optical optical attenuation elements, a control current provided to one of the magneto-optical optical attenuation elements being controlled such that an attenuation characteristic of the sending device conforms to a prescribed characteristic; and a receiving device to receive the attenuated optical signal.

16. An optical attenuation method comprising:

attenuating an optical signal with a first magneto-optical optical attenuation element;

attenuating the optical signal attenuated by the first magneto-optical optical attenuation element with a second magneto-optical optical attenuation element, wherein a attenuation characteristic curve of the first magneto-optical attenuation element is different from an attenuation characteristic curve of the second magneto-optical optical attenuation element; and controlling a control current provided to one of the first and second magneto-optical optical attenuation elements to cause an attenuation characteristic of a sending device to conform to a prescribed characteristic.

17. An optical attenuation device comprising:

an optical attenuation unit including at least two magneto-optical optical attenuation elements coupled in a cascade and having different attenuation characteristic curves, wherein one of the magneto-optical optical attenuation elements has an optical attenuation volume when a control current to said one of the magneto-optical optical attenuation elements is cut, and another of the magneto-optical optical attenuation elements has an attenuation volume which changes in an approximately proportional manner to a control current of said another of the magneto-optical optical attenuation elements.

18. The optical attenuation device as recited in claim 17, wherein the optical attenuation volume of said one of the magneto-optical optical attenuation elements is large enough to prevent output of unnecessary optical signals when the control current to said one of the magneto-optical optical attenuation elements is cut.

19. The optical attenuation device as recited in claim 17, wherein one of the magneto-optical optical attenuation elements is a D type magneto-optical optical attenuation element and another of the magneto-optical optical attenuation elements is an I type magneto-optical optical attenuation element.

20. The optical attenuation as recited in claim 17, wherein one of the magneto-optical optical attenuation elements comprises a faraday rotator, a polarizer and an analyzer, the polarizer having a polarization direction which is 90 degrees with respect to a polarization direction of the analyzer, and another of the magneto-optical optical attenuation elements comprises a faraday rotator, a polarizer and an analyzer, the polarizer having a polarization direction which is parallel with a polarization direction of the analyzer.

21. The optical attenuation device as recited in claim 17, further comprising:

a housing housing the optical attenuation unit.

22. An optical sending device comprising:

an optical attenuation unit including at least two magneto-optical optical attenuation elements coupled in a cascade and having different attenuation characteristic curves, wherein one of the magneto-optical optical attenuation elements has an optical attenuation volume when a control current supplied to said one of the magneto-optical optical attenuation elements is cut, and another of the magneto-optical optical attenuation elements has an attenuation volume which changes in an approximately proportional manner to a control current supplied to said another of the magneto-optical optical attenuation elements; and a current supply unit to supply the control currents to the magneto-optical optical attenuation elements, wherein the control current supplied to said one of the magneto-optical optical attenuation elements is controlled so that an attenuation characteristic of the optical sending device conforms to a prescribed characteristic.

23. The optical sending device as recited in claim 22, wherein the current supply unit supplies a constant control current to said another of the magneto-optical optical attenuation units.

24. An optical communication system comprising:

an optical sending device comprising an optical attenuation unit including at least two magneto-optical optical attenuation elements coupled in a cascade and having different attenuation characteristic curves, wherein one of the magneto-optical optical attenuation elements has an optical attenuation volume when a control current supplied to said one of the magneto-optical optical attenuation element is cut, and another of the magneto-optical optical attenuation elements has an attenuation volume which changes in an approximately proportional manner to a control current supplied to said another of the magneto-optical optical attenuation elements, and a current supply unit to supply said control currents to the magneto-optical optical attenuation elements, wherein the control current provided to said one of the magneto-optical optical attenuation elements is controlled so that an attenuation characteristic of the optical sending device conforms to a prescribed characteristic; and a receiving device to receiving an optical signal attenuated by the optical attenuation unit.

* * * * *

UNITED STATES PATENT AND TRADEMARK OFFICE
CERTIFICATE OF CORRECTION

PATENT NO. : 6,345,142 B1 Page 1 of 1
DATED : February 5, 2002
INVENTOR(S) : Hiroaki Nakazato et al.

It is certified that error appears in the above-identified patent and that said Letters Patent is hereby corrected as shown below:

<u>Title page,</u>
Item [56], References Cited, add -- JP 58-049916A (abstract) --

<u>Column 15,</u>
Line 38, change "a" to -- an --.
Line 39, after "optical" insert -- optical --.

Signed and Sealed this

Thirteenth Day of August, 2002

*Attest:*

*Attesting Officer*

JAMES E. ROGAN
*Director of the United States Patent and Trademark Office*